United States Patent

Lish

[11] Patent Number: 5,662,139
[45] Date of Patent: Sep. 2, 1997

[54] PRESSURE RELIEF VALVE WITH LOCKOUT POSITION

[76] Inventor: Dennis N. Lish, 2501 Greenbier La., La Habra, Calif. 90631

[21] Appl. No.: 525,125

[22] Filed: Sep. 8, 1995

[51] Int. Cl.[6] .................................. F16K 15/18
[52] U.S. Cl. .................. 137/523; 251/83; 73/168
[58] Field of Search ..................... 137/522, 523; 251/82, 83; 73/168; 169/5, 16, 18, 23, 43

[56] References Cited

U.S. PATENT DOCUMENTS

| | | | |
|---|---|---|---|
| 1,196,862 | 9/1916 | Hayes | 137/523 |
| 1,198,956 | 9/1916 | Richardson et al. | 137/523 |
| 1,436,650 | 11/1922 | Gilbert | 137/523 X |
| 2,634,748 | 4/1953 | Morrison | 251/83 X |
| 2,641,437 | 6/1953 | Jay et al. | 251/83 X |
| 2,657,704 | 11/1953 | Fausek et al. | 137/523 |
| 2,922,436 | 1/1960 | Brash | 137/523 |
| 4,580,596 | 4/1986 | Stehling | 251/83 X |
| 4,948,092 | 8/1990 | Kasper et al. | 137/523 X |
| 5,103,862 | 4/1992 | Mc Hugh | 73/168 |
| 5,178,185 | 1/1993 | Stehling | 251/83 X |

*Primary Examiner*—John Rivell
*Attorney, Agent, or Firm*—Edgar W. Averill, Jr.

[57] ABSTRACT

A lever actuated pressure relief valve useful at the base of a gridded sprinkler system to perform three functions. The first function is as a pressure relief valve for the sprinkler system, the second function is a closed position for permitting the pressure testing of the sprinkler system, and the third position is an open position to permit the testing of the alarm system of the sprinkler system. The valve has a spring loaded valve stem which is operated by a lever which may be moved under a covered recess to hold the valve in a closed position. It may be moved to a pressure relief system where the valve is held only by a valve spring. It may also be turned to a third position where the valve is opened.

6 Claims, 3 Drawing Sheets

1

PRESSURE RELIEF VALVE WITH LOCKOUT POSITION

BACKGROUND OF THE INVENTION

The field of the invention is water valves and the invention relates more particularly to valves used at the base of a gridded sprinkler system.

Sprinkler systems are commonly used in commercial buildings to provide an automatic water spray in the event of a fire which automatic spray can, and often does, prevent a fire from spreading. When the commercial building is a relatively large building, the amount of water captured in the fire sprinkler system is substantial. The water pipes must be sized to permit a substantial flow of water in the event of the opening of one or more sprinkler heads. It is also necessary that one or more check valves be provided to prevent the water in the system from re-entering the city water supply. The result is a substantial volume of water within a closed piping system. When the temperature of this water in the closed piping system increases slightly as the surrounding area warms, some method must be provided to permit the water to escape. If this is not done, a serious leak or damage to the system might result. Thus, it is common to provide a pressure relief valve at the base of the system to relieve such excess pressure.

However, the simple placement of a pressure relief system at the base is not sufficient because the system also must permit two types of testing. One type of testing is provided to test the alarm system. This alarm test is meant to simulate the flow of water from a sprinkler in the event of a fire which flow is intended to sound an audible and often to trigger other alarms such as an automatic dialing alarm. A further test is also required which is a pressure test where the system must be permitted to be brought to a relatively high pressure such as at least 200 psi for two hours.

To accomplish this combination of requirements, a "Christmas tree" of fittings is typically used which includes two tees, two on/off valves, a pressure relief valve and a loop of piping to provide two separate flow paths.

SUMMARY OF THE INVENTION

It is an object of the present invention to simplify the piping at the base of a gridded sprinkler system.

The present invention is for a lever actuated globe valve having pressure relief capabilities and a lockout position. The valve has a valve body with an inlet, a valve seat and an outlet. A valve stem support member is held by the valve body and the valve stem support member has a cam surface formed near its remote end. The cam surface has a lowermost portion which includes a covered recess and the cam surface extends radially outwardly from the covered recess and includes a ramped area terminating in a generally flat upper area. A valve stem is held by the valve stem support member and has an exterior end which extends above the cam surface. It also has a valve washer which contacts the valve seat and a spring is held against the valve stem forcing it into a closed position when not otherwise constrained. An elongated control lever is pivotally affixed near the exterior end of the valve stem and this control lever may be moved into the covered recess which prevents the valve stem and valve washer from being moved away from the valve seat. A cam follower pin is also affixed to the valve stem near the exterior end and rides on the cam surface. By moving the elongated control lever so that it rotates the valve stem, the cam follower pin causes the valve stem to rise and as it reaches the upper generally flat area holds the valve in an open position. The result is that a single valve carries out the function of a pair of tees, the pair of valves and a pressure relief valve and associated piping heretofore believed necessary. The present invention is also for the process of reducing the number of parts at the exit end of a gridded fire sprinkler system by using the above-described valve.

DESCRIPTION OF THE PREFERRED EMBODIMENTS

Figure 1:
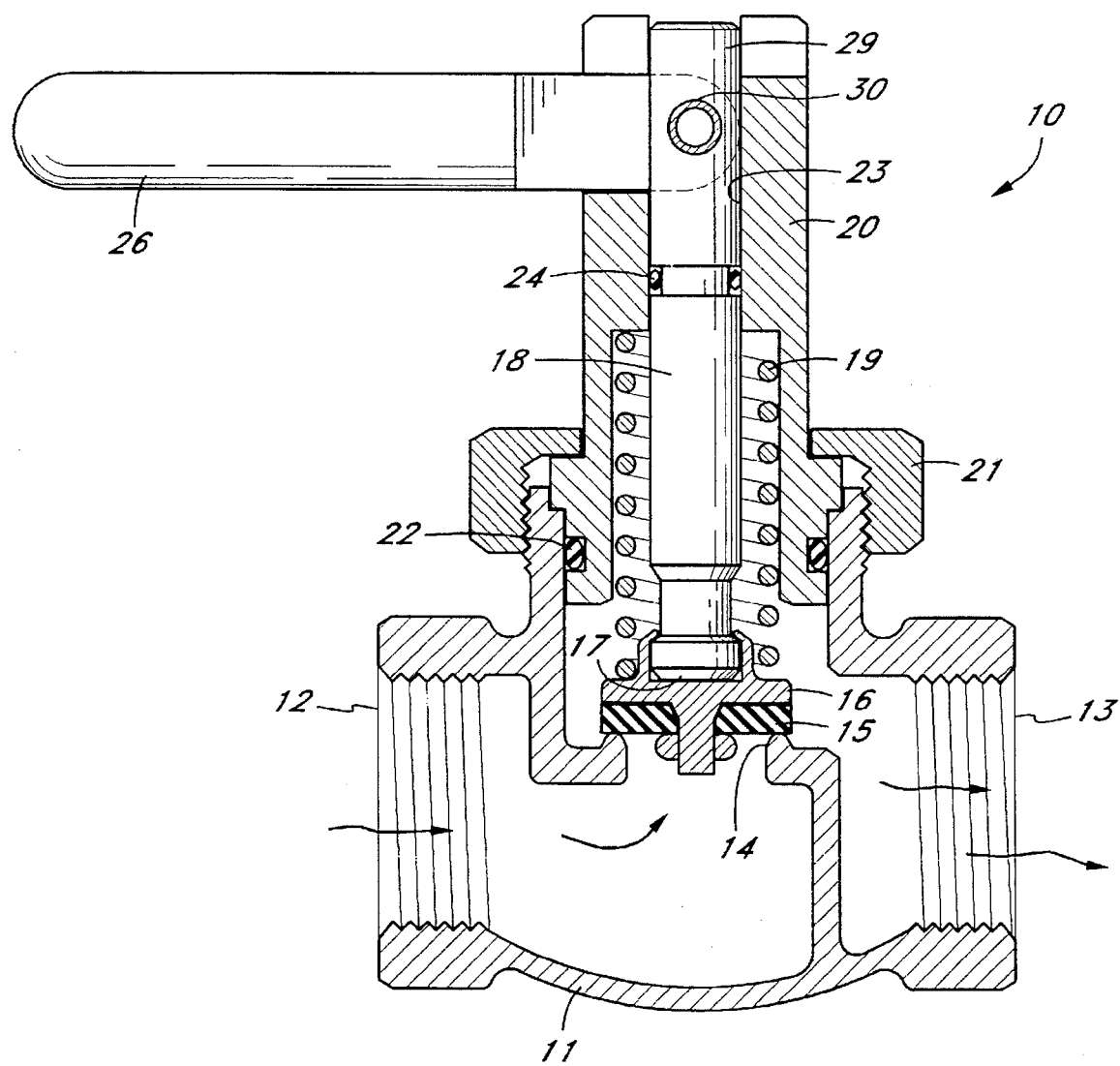
FIG. 1 is a cross-sectional view of the lever actuated globe valve of the present invention.

The valve of the present invention is shown in cross-sectional view in FIG. 1 and indicated generally by reference character 10. Valve 10 is a lever actuated globe valve which has a valve body 11 with an inlet 12 and an outlet 13. A valve seat 14 is opened and closed by contact with a valve washer 15 in a conventional manner. Valve washer 15 is held against a valve washer support 16 pivotally held at the inner end 17 of valve stem 18. A helical spring 19 holds the valve washer support 16 and valve washer 15 against valve seat 14 when valve stem 18 is not otherwise lifted. The result when valve stem 18 is not otherwise constrained is to provide a pressure relief valve. Spring 19 is selected to provide sufficient force so that the valve does not permit the passage of any water until the pressure at inlet 12 exceeds about 175 pounds or whatever preselected inlet pressure is desired to open the valve.

Valve stem 18 is held in valve stem support member 20 by a nut 21. Valve stem support member 20 is sealed at its lower end by an O-ring 22 against leakage from valve body 11. The valve stem 18 is sealed within a central opening 23 by O-ring 24.

Figure 2:
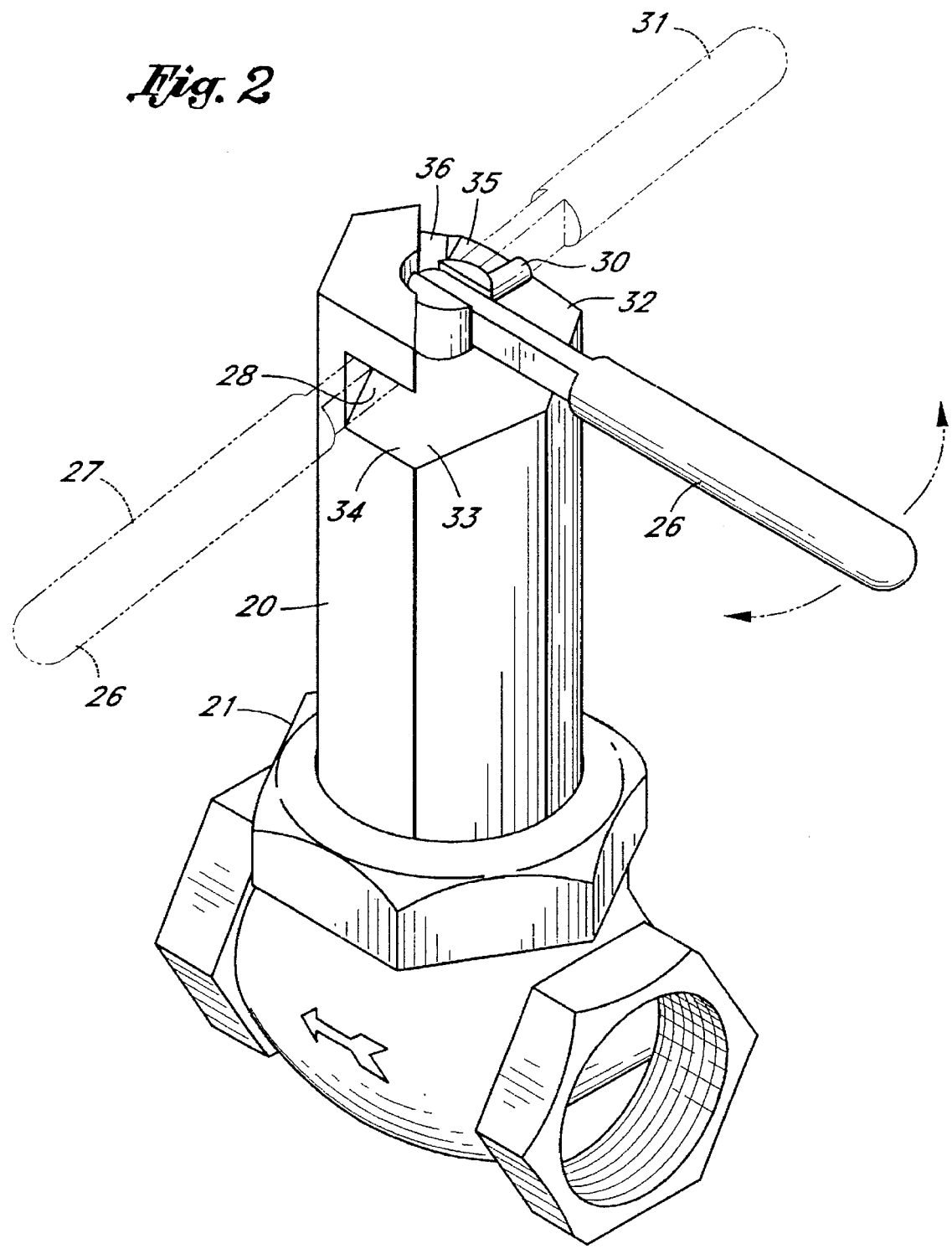
FIG. 2 is a perspective view thereof.

Valve stem support member 20 has a cam surface 33 which is shown best in FIG. 2 of the drawings. Cam surface 33 guides an elongated control lever 26 when the valve is in a closed position as indicated by a phantom line in FIG. 2 by reference character 27. As lever 26 is in the closed position 27 it is held under covered recess 28 which prevents valve stem 18 from rising no matter how much pressure exists at inlet 12. Elongated control lever 26 is pivotally held near the exterior end 29 of valve stem 18 by a cam follower pin 30 which functions both as a cam follower as well as a means for holding elongated control lever 26 to valve stem 18. In this position, the system can be pressure tested to 200 psi without the valve opening.

Figure 4:
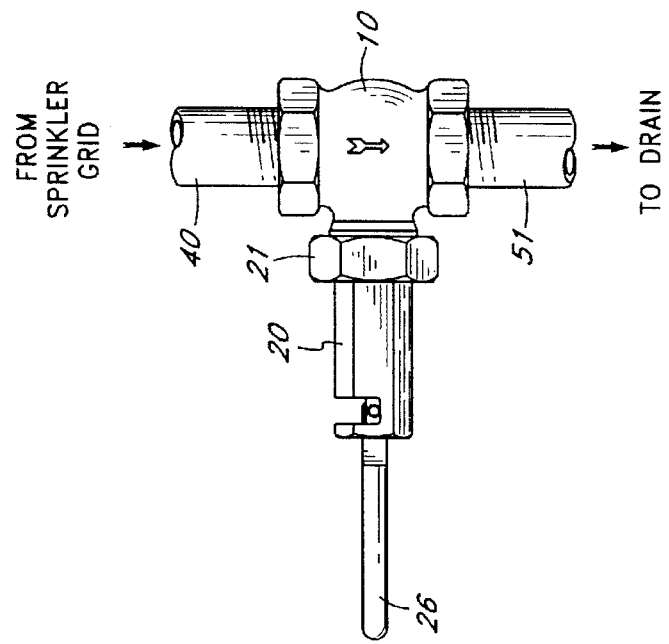
FIG. 4 is a side view of the valve of the present invention installed at the base of a gridded fire sprinkler system.

As elongated control lever 26 is moved out from under covered recess 28 to the position shown in FIG. 2, or to the position shown in FIG. 4, valve 10 operates as a pressure relief valve. This would be its normal operating position at the base of a gridded sprinkler system.

When it is desired to open valve 10 for testing the alarm system, lever 26 is further turned to the position indicated by reference character 31 in FIG. 2 where cam follower pin 30 rides upwardly along the ramped area 32 of cam surface 33. Cam surface 33 has a lower generally flat area 34 as well as the ramped area 32 which may either be smoothly angled or sharply stepped to an upper generally flat area 35. The upper generally flat area 35 preferably has a small ridge 36 which holds the cam follower pin on the upper generally flat area 35 to hold the valve in an open position for testing.

Figure 3:
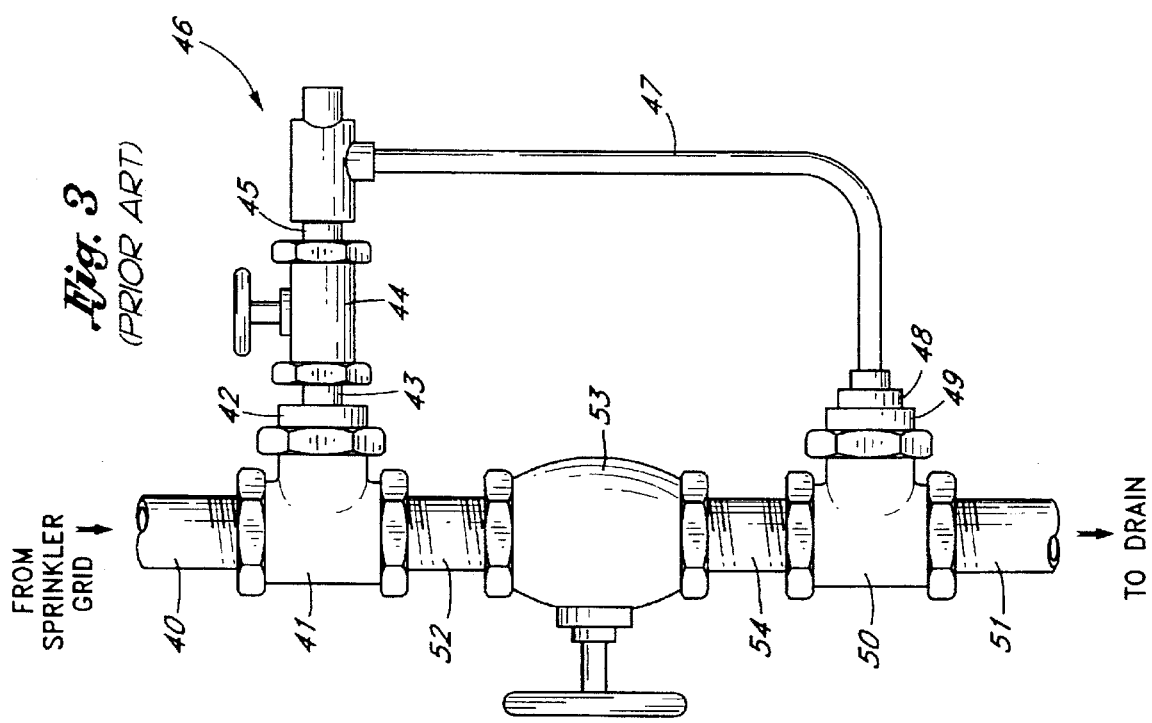
FIG. 3 is a diagrammatic view of the prior art piping at the base of a gridded fire sprinkler system.

To appreciate the substantial savings in parts and simplicity of operation of the valve of the present invention, the prior art valving system is shown in FIG. 3. A pipe 40 is positioned at the base of a sprinkler grid and is typically a threaded pipe. A first tee 41 is threaded onto the base of pipe 40 and includes a reducer 42 which holds a nipple 43 which in turn is threaded onto a valve 44. Valve 44 has an exit nipple 45 which is threaded onto a pressure relief valve 46. Pressure relief valve 46 has a drain line 47 which leads to a pair of reducers 48 and 49 to a second tee 50. Second tee 50 has an exit pipe 51 which leads to a drain. First tee 41 has an exit pipe 52 which is threaded onto a test valve 53. Test valve 53 is opened to simulate a sprinkler head being opened to test the alarm system. Test valve 53 has an exit nipple 54 which leads to second tee 50. In operation, test valve 53 is closed and valve 44 is open which permits the pressure relief valve 46 to relieve any excess pressure in the sprinkler grid from which pipe 40 exits. Any such excess pressure is relieved through drain line 47 into the drain through tee 50. When it is desired to pressure test the system, valve 44 is closed and pressure in the system is raised to the desired test pressure to check for leaks. After the pressure test is completed, valve 44 is again opened for normal operation. If it is desired to test the alarm, valve 53 is opened. After the test, valve 53 is closed. It is, of course, important that valve 44 be retained in an open position during normal operation.

In contrast, all of the piping of FIG. 3 can be replaced simply by the valve 10 of the present invention as shown in FIG. 4. When the valve is positioned as shown in FIG. 4, it is easy to see that it is in its pressure relief position by the positioning of elongated control lever 26 which is aligned with valve stem support member 20 during normal operation. When it is desired to pressure test the system, lever 26 is moved to the closed position indicated by reference character 27 in FIG. 2 wherein the valve will not permit the passage of any water when the pressure is raised to the desired testing pressure.

When it is desired to test the alarm, lever 26 is moved to the position indicated by reference character 31 which raises the valve stem 18 and permits a substantial flow of water around valve seat 14 to test the alarm. The result is an easy to use assembly which eliminates a substantial number of parts, each of the parts providing a potential leak. The valve also can readily be seen at a distance to be in an operating position when lever 26 is aligned with valve stem support member 20.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A lever actuated globe valve having pressure relief capability and a lock out position for use in a conduit containing a fluid under pressure, said valve comprising:

a valve body having an inlet, a valve seat and an outlet;

a valve stem support member affixed to said valve body and said valve stem support member being aligned with said valve seat and said valve stem support member having a valve body end and a remote end and said valve stem support member having a cam surface formed near its remote end, said cam surface having a lowermost portion including a covered recess, said lowermost portion extending radially out from under said covered recess and said cam surface having a lower, generally flat area, a ramped area and an upper, generally flat area;

a valve stem having an inner end and an exterior end, said valve stem being held by said valve stem support member and said valve stem having a valve washer held at the interior end thereof said valve washer being movable into and out of contact with said valve seat, said valve stem and said valve washer being biased toward a closed position and said valve stem extending outwardly from said valve stem support member and said valve stem having a central axis;

an elongated control lever pivotally affixed near the exterior end of said valve stem, said elongated control lever being positionable at about a right angle with respect to said valve stem and said elongated control lever being movable into said covered recess; and a cam follower pin fixed to said valve stem near the exterior end thereof and extending outwardly from said valve stem to ride along said cam surface whereby said valve washer is securely held against said valve seat when said elongated control lever is under said covered recess, is in a pressure relief mode when said elongated control lever is out from under said covered recess and said cam follower pin is adjacent said lower generally flat area and in an open mode when said cam follower pin is on said upper, generally flat area.

2. The lever actuated globe valve of claim 1 wherein said elongated control lever is pivotally movable so that it may be about aligned with said valve stem.

3. The lever actuated globe valve of claim 1 wherein said ramped area is angled smoothly from the lower, generally flat area to said upper generally flat area.

4. The lever actuated globe valve of claim 1 wherein said cam follower pin forms a pivot pin for said elongated control lever.

5. The lever actuated globe valve of claim 1 wherein said valve stem is biased toward a closed position by a helical spring held against a step within said valve stem support member.

6. The lever actuated globe valve of claim 1 wherein said upper, generally flat area has a slight recess to assist in retaining the cam follower pin on the upper, generally flat area.

* * * * *